United States Patent [19]
Kang

[11] Patent Number: 6,012,108
[45] Date of Patent: Jan. 4, 2000

[54] DEVICE FOR DUALIZING MAIN PROCESSORS IN AN ASYNCHRONOUS TRANSFER MODE SWITCH AND METHOD THEREFOR

[75] Inventor: Sung-Dae Kang, Seongnam, Rep. of Korea

[73] Assignee: SamSung Electronics Co., Ltd., Suwon, Rep. of Korea

[21] Appl. No.: 08/885,734

[22] Filed: Jun. 30, 1997

[30] Foreign Application Priority Data

Jun. 29, 1996 [KR] Rep. of Korea ................ 96-26407

[51] Int. Cl.[7] .................... G06F 13/14; G06F 13/38; H04L 12/02
[52] U.S. Cl. .................... 710/54; 370/395; 710/130
[58] Field of Search .................... 370/395; 710/54, 710/129, 130; 709/213

[56] References Cited

U.S. PATENT DOCUMENTS

| | | | |
|---|---|---|---|
| 4,935,894 | 6/1990 | Ternes et al. .................... | 710/128 |
| 5,072,440 | 12/1991 | Isono et al. .................... | 370/220 |
| 5,123,099 | 6/1992 | Shibata et al. .................... | 711/120 |
| 5,153,578 | 10/1992 | Izawa et al. .................... | 370/395 |
| 5,450,547 | 9/1995 | Nguyen et al. .................... | 713/600 |

*Primary Examiner*—Thomas C. Lee
*Assistant Examiner*—Albert Wang
*Attorney, Agent, or Firm*—Robert E. Bushnell, Esq.

[57] ABSTRACT

A device for dualizing main processors in an ATM switch and a method therefor. The device for dualizing main processors in an asynchronous transfer mode switch, including: dualization controllers, each of which is in an active mode and a standby mode and connected s with memories of each of corresponding modes by way of an MBS, each of the dualization controller is comprised of: a first-in first-out; a write buffer connected between the MBUS in the active mode and the first-in first-out; a write controller for storing data stored at the write buffer at the first-in first-out; a read buffer connected between the MBUS in the standby mode and the first-in first-out; a read controller for simultaneously storing data stored at the first-in first-out, at the read buffer, checking status of the MBUS in the standby mode, and outputting the data stored at the read buffer to the MBUS in the standby mode.

6 Claims, 6 Drawing Sheets

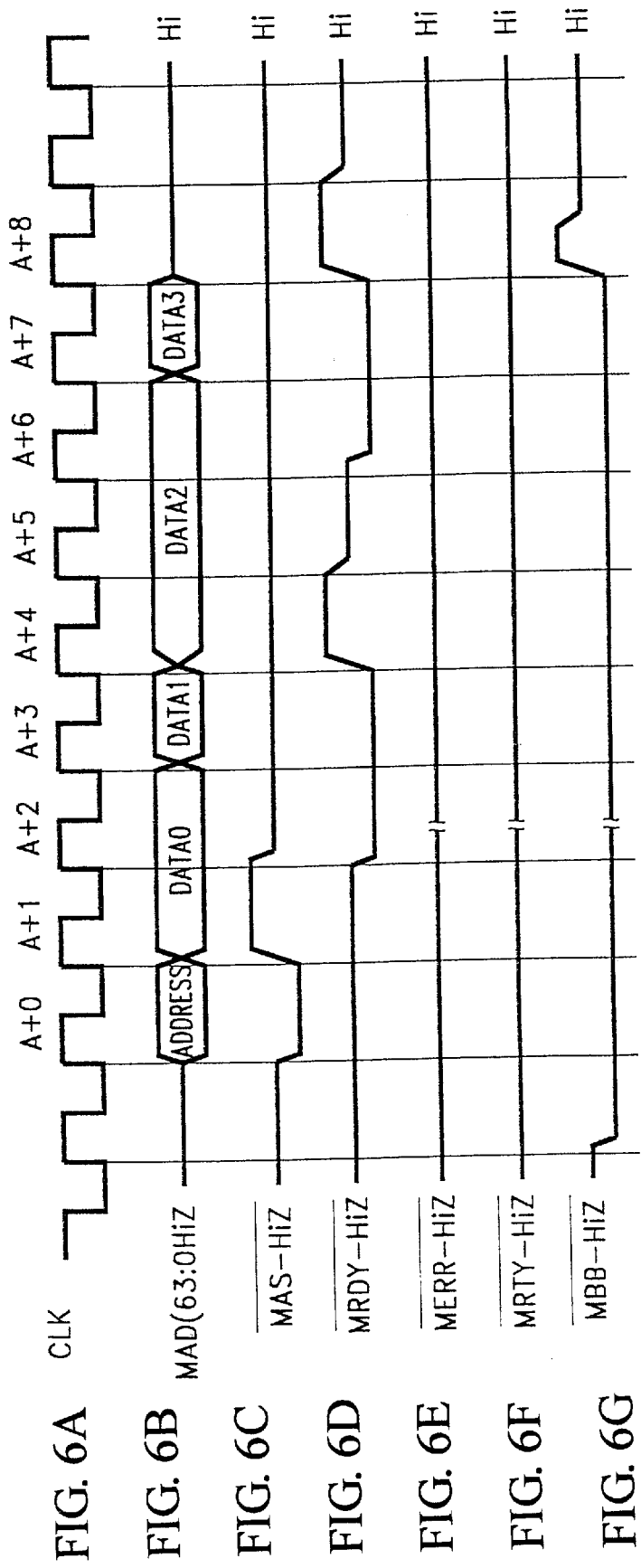

DEVICE FOR DUALIZING MAIN PROCESSORS IN AN ASYNCHRONOUS TRANSFER MODE SWITCH AND METHOD THEREFOR

This application makes reference to, incorporates the same herein, and claims all benefits accruing under 35 U.S.C. §119 from an application for *Device For Dualizing Main Processors In An Asynchronous Transfer Mode Switch And Method Therefore* earlier filed in the Korean Industrial Property Office on the 29$^{th}$ day of June 1996 and there duly assigned Ser. No. 26407/1996, a copy of which application is annexed hereto.

BACKGROUND OF THE INVENTION

1. Field of the Invention

The present invention relates to a data transferring device and method in an asynchronous transfer mode switch and, more specifically, to a device for dualizing main processors and transferring data from an active main processor to a standby main processor.

2. Description of the Related Art

FIG. 1 is a diagram showing the construction of an asynchronous transfer mode switch. As depicted in FIG. 1, an asynchronous transfer mode switch (ATM) includes local subsystems 10 connected with a subscriber and a trunk, and a central subsystem 22 for switching ATM cells of local subsystems 10.

Further, each local subsystem 10 is constructed with a subscriber interface module (SIM) 12 for interfacing with the subscriber, a trunk interface module (IM) 13 for interfacing with the trunk, a local switch 14 for switching-outputting cells of SIM 12 and TIM 13, and a main processor 11 for controlling local switch 14 and overall operations of the corresponding local subsystem.

Furthermore, central subsystem 22 is comprised of a central switch 20 and main processor 21, central switch 20 is connected with each local subsystem 10 and the switching-outputting the cells of the local subsystems 10, and main processor 21 controls overall operations of central switch 20.

Because transferring the cells by using the asynchronous transfer mode, the ATM switch having the construction as mentioned previously, has its communication system different from that of a general line switch and thus, main processors 11 and 21 have the construction very different from the above general line switch. In general, main processors 11 and 21, used for local subsystems 10 and the central subsystem 22, are operated with a single construction as shown in FIG. 2 by adhering a main board to a work station. Herein, the above main processors will be explained with being assumed to be a sun work station and a product of SUN MICROSYSTEMS CO., LTD.

FIG. 2 is a block diagram showing the construction of a main processor in a conventional asynchronous transfer mode switch having the construction of FIG. 1.

With respect to the construction of the main processor having the construction of FIG. 2, a main controller 212 is a microprocessor for controlling the overall operations of the work station annd can be replaced with a SuperSPARC CPU. A cache controller 214 is connected with an MBUS 251 and controls its function of interfacing data between an E-cache (External cache) 216 and MBUS 251 under the control of main controller 212. A memory controller 220 is coupled with MBUS 251 and controls the data interfacing function between MBUS 251 and a memory 218.

An M bus to S bus interface (MSI) 222 performs its interfacing function between MBUS 251 and an SBUS 253. A SEC (S bus to External bus Controller) 224 performs its function of matching the SBUS 253 and a low speed external EPROM, NVRAM, Serial controller and etc. A MACIO (MAster I/O controller) 226 performs its function of being matched with the SBUS 253 and, SCSI, Ethernet, and etc.

Then, MBUS 251 as a SPARC internal standard bus, corresponds to a 64 bit bus for communicating the processor and memory controller 220. SBUS 253 is connected with MBUS 251 by MSI 222, which corresponds to a 32 bit bus for being matched with SCSI, Ethernet, EPROM, Serial controller, etc.

I have determined that when using the main processor of the single construction as explained above, once the processor is down, the operation of the corresponding subsystem is terminated. For this reason, there is a problem in that the service of the switch can be stopped resultedly. In order to solve the foregoing problem, the main processors of local subsystem 10 and central subsystem 22 are designed with having the dualization construction, and the main processor of the dualization construction transfers the data processed by the active processor to the standby processor, so that two processors can have the same data as each other, according to the principles of the present invention.

SUMMARY OF THE INVENTION

It is an object of the present invention to provide a device for dualizing main processors in an ATM switch and a method therefor.

It is another object of the present invention to provide a device for transferring data processed in an active processor to a standby processor by a main processor having the dualization construction in an ATM switch and a method therefor.

In order to achieve these and other objects, the present invention is provided with a device for dualizing main processors in an asynchronous transfer mode switch, comprising: dualization controllers, each of which is in an active mode and a standby mode and connected with memories of each of corresponding modules by way of a MBUS, each dualization controller is comprised of: a first-in first-out (FIFO); a write buffer connected between the MBUS in the active mode and the FIFO; a write controller for storing data stored at the write buffer at the FIFO; a read buffer connected between the MBUS in the standby mode and the FIFO; a read controller for simultaneously storing data stored at the FIFO, at the read buffer, checking status of the MBUS in the standby mode, and outputting the data stored at the read buffer to the MBUS in the standby mode.

The present invention is more specifically described in the following paragraphs by reference to the drawing attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 6A–6G show operational characteristics of the device for transferring thereto the data as illustrated in FIG. 5.

DETAILED DESCRIPTION OF THE PREFERRED EMBODIMENT(S)

Figure 1:
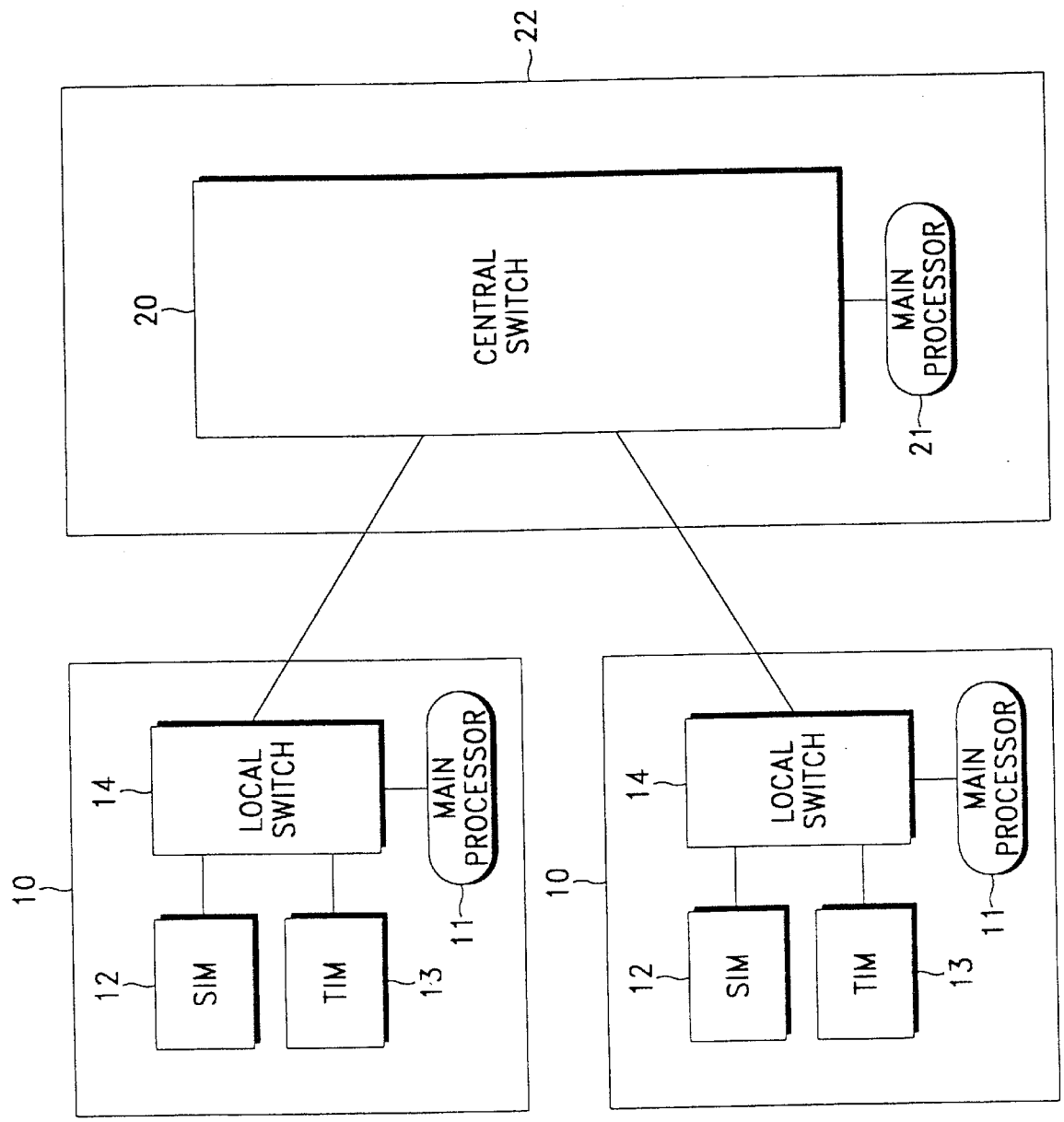
FIG. 1 is a diagram showing the construction of an asynchronous transfer mode switch.

Hereinafter, a preferred embodiment of the present invention will be concretely explained with reference with accompanying drawings. Most of all, throughout the drawings, it is noted that the same reference numerals of letter will be used to designate like or equivalent elements having the same function.

Figure 2:
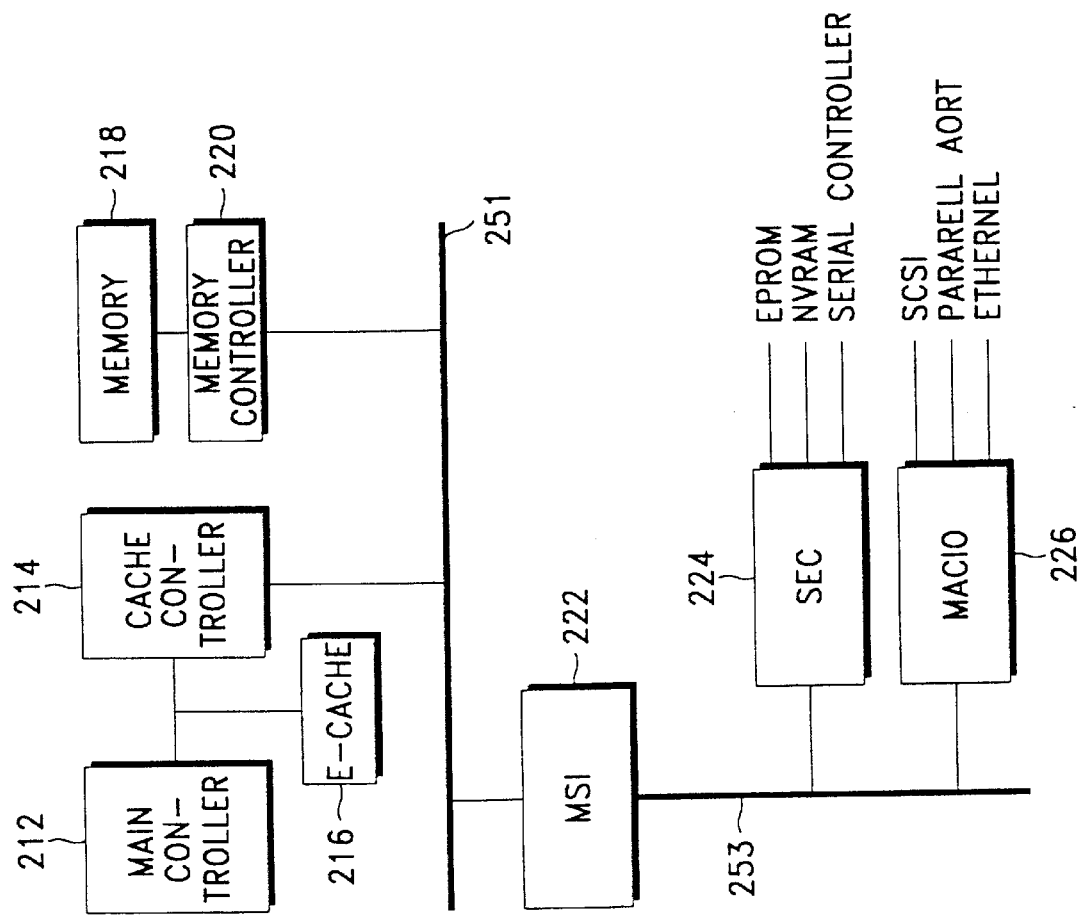
FIG. 2 is a block diagram showing the construction of a main processor in a conventional asynchronous transfer mode switch having the construction of FIG. 1.

The ATM switch for performance of the present invention has the same construction and reference numerals as those of FIG. 2.

Figure 3:
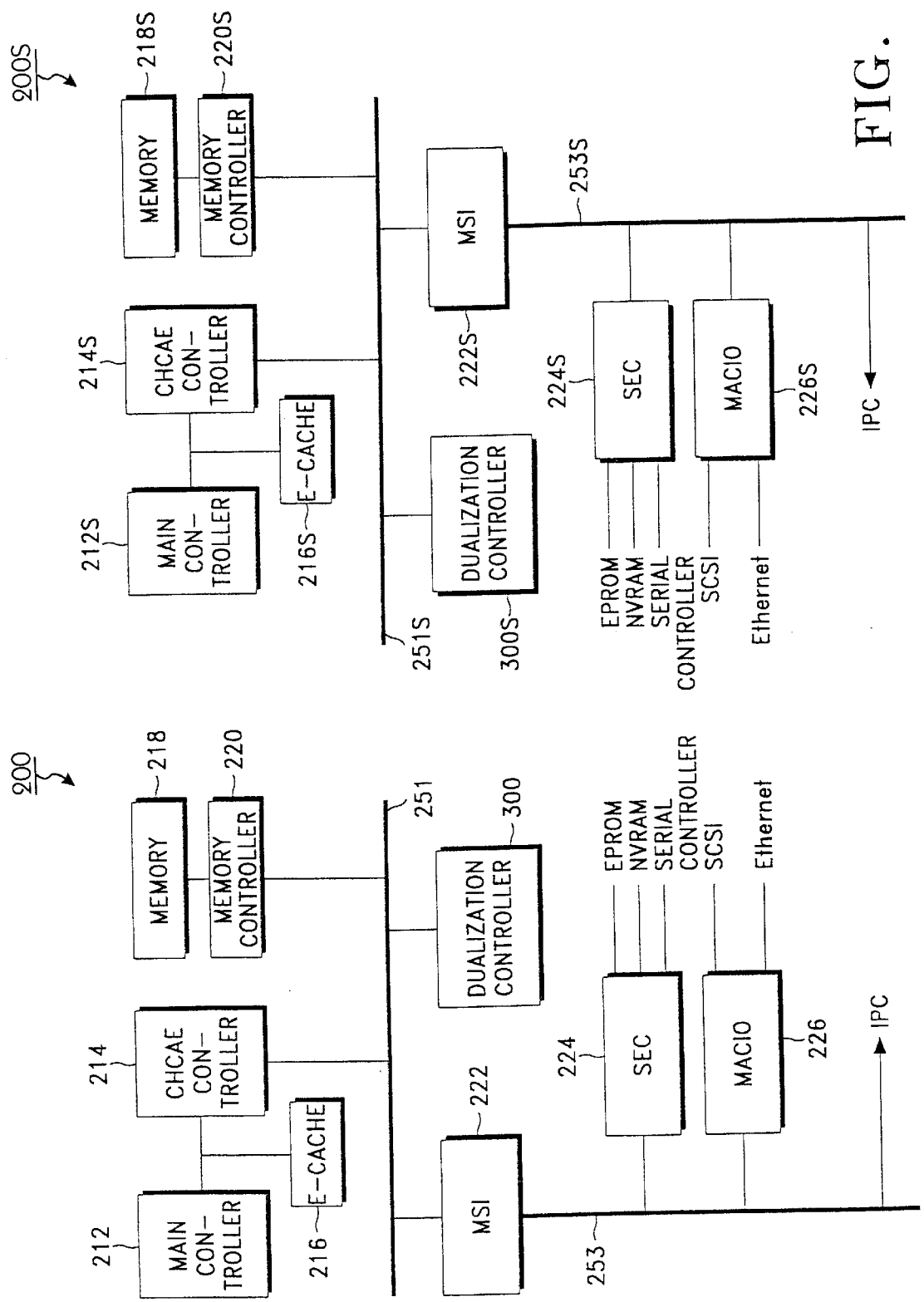
FIG. 3 is a block diagram showing the construction of a main processor having dualization construction in an asynchronous transfer mode switch according to an embodiment of the present invention.

FIG. 3 is a block diagram showing the construction of a main processor having dualization construction in an asynchronous transfer mode switch according to an embodiment of the present invention, where components expressed with "S" among the reference numerals are assumed as the main processor in the standby mode. Also, it is assumed that reference numeral "200" is an active main processor and reference numeral "200S" is a standby main processor.

Referring to FIG. 3, the construction of a main processor 200 in the active mode and a main processor 200S in the standby mode are equal to each other. The main processor of the dualization construction according to an embodiment of the present invention further includes dualization controllers 300 and 300S for transferring the data processed at main processor 200 in the active mode to main processor 200S in the standby mode.

Figure 4:
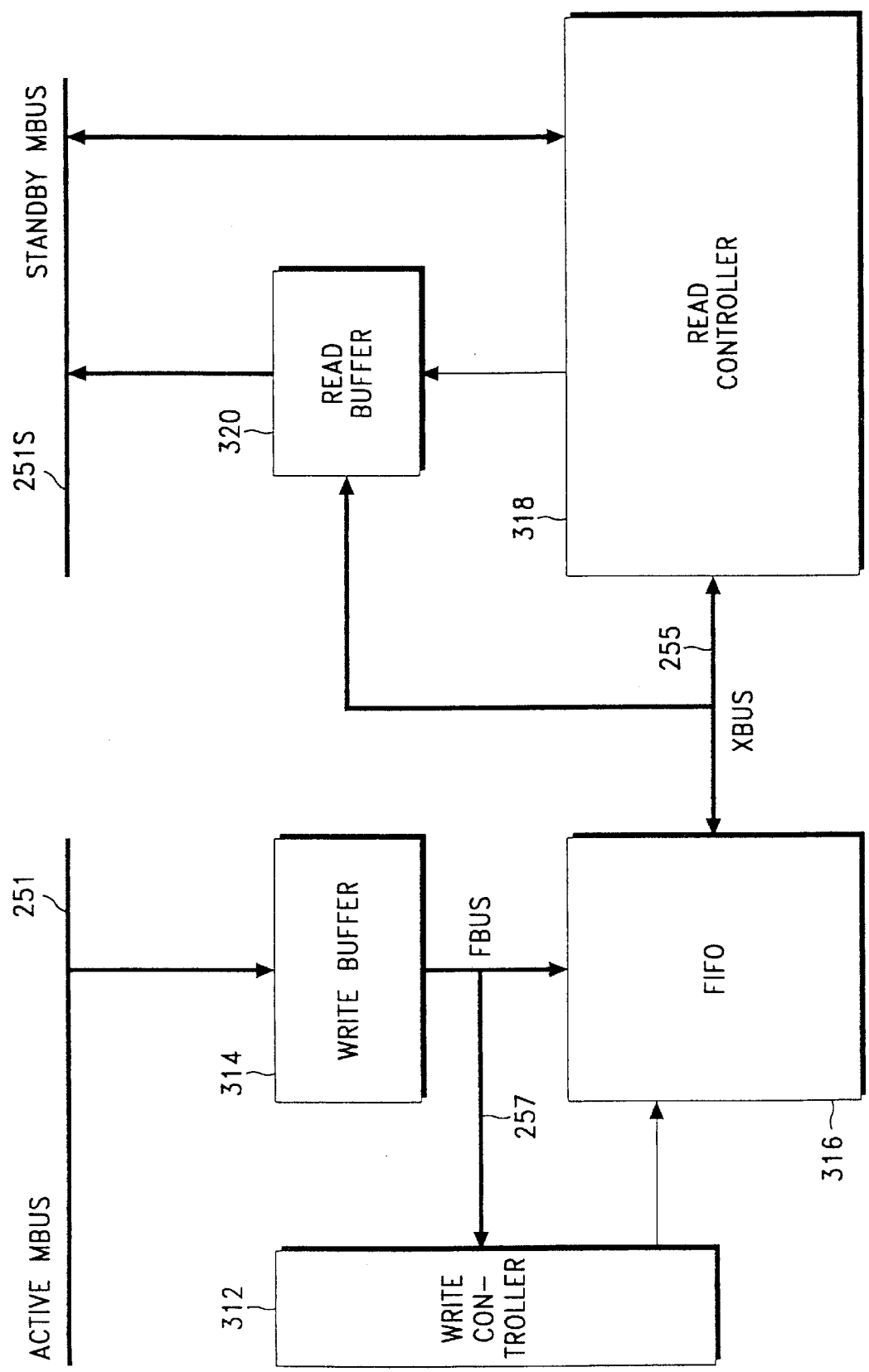
FIG. 4 is a block diagram showing the construction of each bus in the main processor as shown in FIG. 3.

FIG. 4 is a block diagram showing the construction of each bus in the main processor as shown in FIG. 3. Dualization controller 300 (or 300S) transfers data output from MBUS 251 (or 251S) output from the corresponding main processor 200 (or 200S), to dualization controller 300S (or 300) of a counterpart, and dualization controller 300S (or 300) outputs the transferred data to the corresponding MBUS 251S (or 251). In the construction of FIG. 4, the active dualization controller 300 is constructed with a write controller 312, a write buffer 314, and a FIFO (first-in first-out) 316 and standby dualization controller 300S is constructed with a read controller 318 and a read buffer 320.

In the construction of dualization controllers 300 and 300S, write buffer 314 is connected with MBUS 251 and stores the data of MBUS 251 so as to be transferred to the main processor. Write controller 312 stores the data stored at write buffer 314 through the FBUS to FIFO 316. FIFO 316 is connected with write buffer 314 by way of the FBUS 257 and with read buffer 320 by way of transfer bus (XBUS) 255. Read controller 318 reads the data stored at FIFO 316 through XBUS 255 and outputs the read data to read buffer 320. Read buffer 320 stores the data read at FIFO 316 under the control of read controller 318 and thus, outputs the read data to MBUS 251S.

MBUS 251 of FIG. 4 is connected between memory controller 220 and dualization controller 300 and transfers the data, that is, a 64 bit MAD[63:0]. Dualization controller 300 inputs and outputs the MAD[63:0] by connecting write buffer 314 and read buffer 320 to the MBUS. FBUS 257 is connected between read buffer 314 and FIFO 316 and transfers the data, a 64 bit FMAD[63:0]. XBUS 255 is connected between FIFO 316 and read buffer 320 and transfers the data, that is, a 64 bit XMAD[63:0].

Figure 5:
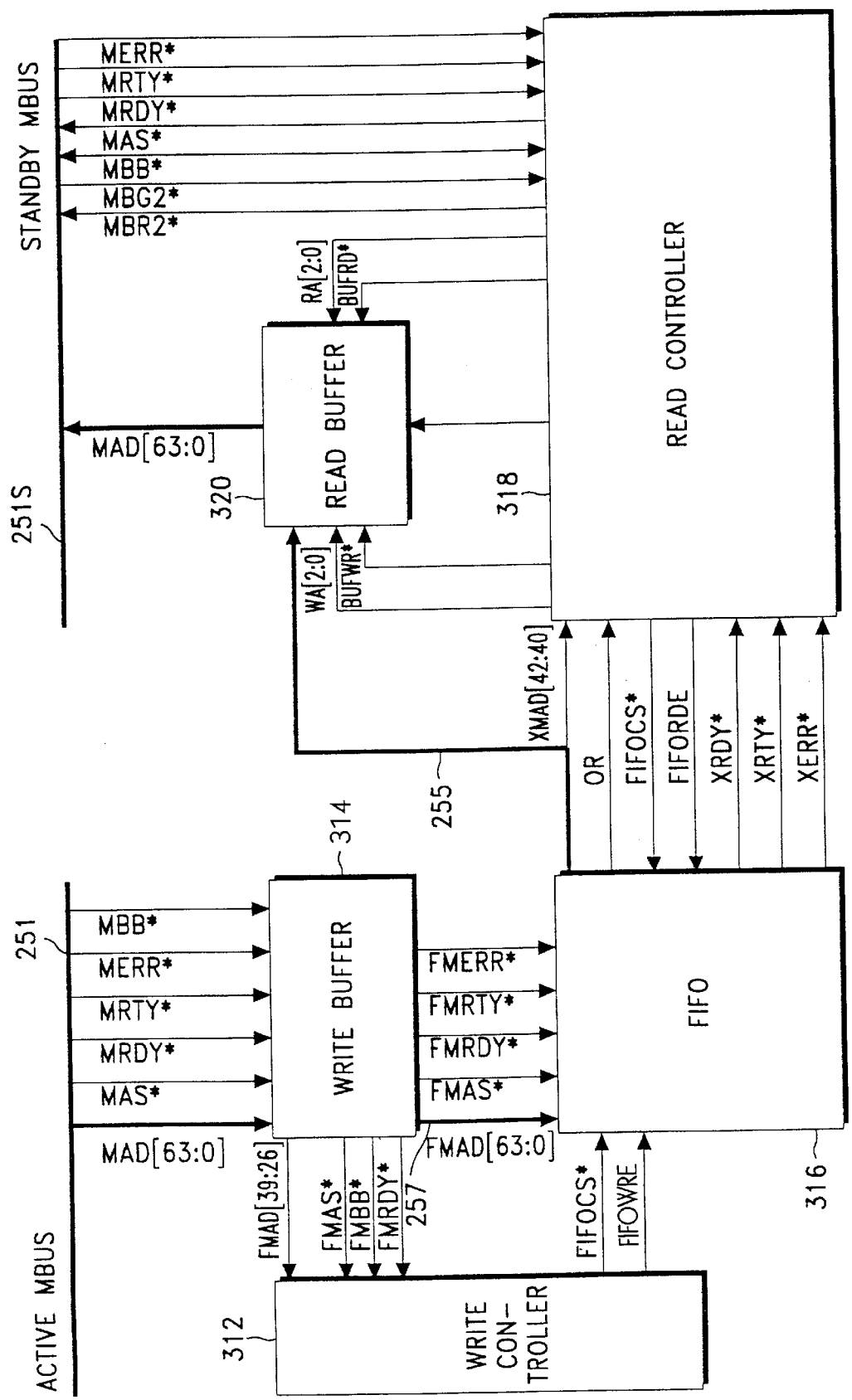
FIG. 5 is a block diagram showing the construction of a device for transferring to a main processor, data of an active main processor in the dualization construction of the main processor according to an embodiment of the present invention.

FIG. 5 is a block diagram showing the construction of a device for transferring to a main processor, data of an active main processor in the dualization construction of the main processor according to an embodiment of the present invention, wherein write buffer 314 stores the MBUS signals of the MBUS 251, MAD[63:0], XAS, MRDY, MRTY, MERR, MBB and etc. After inputting and analyzing FMAD [39:26], FMAS, FMBB, FMRDY in write buffer 314, write controller 312 outputs FIFOCS and FIFOWRE and stores the data stored at write buffer 314, FMAD[63:0], FMAS, FMRDY, FMRTY, and FMRTY through FBUS 257 at FIFO 316.

FIFO 316 sequentially stores the data of write buffer 314 in an input order, through FBUS 257 upon FIFOCS an FIFOWRE are generated in write controller 312. When the data is written in the internal, FIFO 316 generates an output ready (OR) signal, outputs the generated signal to read controller 318, informs that there is data to be transferred to standby M-BUS 257, and in a sequential manner, outputs the data at XBUS 255 from the first-stored data upon FIFOCS and FIFORDE signals being input from read controller 318. FIFO 316 has the information of XMAS and XMAD[63:0] at a first depth of one transaction and there is the information of XMAD[63:0], XMRDY, and XMRTY at the depth of the above transaction.

Read buffer 320 is capable of being substituted by a dual port RAM, which has as 5 depth, the write address and the read address. Read buffer 320 stores XMAD[63:0] which is output from FIFO 316 by the control of read controller 318, and the data is processed to thereby be output to MBUS 251S by the control of read controller 318. At this time, XMAD[63:0] of the address mode is stored at 0 address and XMAD[63:0] of the data mode is stored at 1–4 addresses.

Read controller 318 including a size controller, reads the data stored at FIFO 316, stores the read data at read buffer 320, again reads the stored data, and outputs the re-read to MBUS 251S.

First of all, in regard to operation of the size controller of read controller 318, XMAD[42:40] output from FIFO 316 is analyzed and the size thereof is analyzed by the size controller. In this instance, the size of the data stored at FIFO 316 becomes [1:0]="00" in the event that XMAD[42:40]= "101". Or, the size thereof becomes [1:0]="01" in the event that XMAD[42:40]="100" and the size thereof becomes [1:0]="01" in the event that XMAD[42:40]="0".

Secondly, when the OR signal occurs at FIFO 316, the read controller 318 checks whether or not data exists in read buffer 320, and when checked that no data existed therein, outputs FIROCS and FIFORDE to FIFO 316, reads the data stored at FIFO 316, and stores the read data through the XBUS 257 to read buffer 320.

Thirdly, for the sake of being a master of MBUS 251S, it is required with using of bus at MBUS 251S. Thus, in response to this, read controller 318 reads the data stored at read buffer 320 and outputs the read data to MBUS 251. To meet it, read controller 318 generates an MBR signal at MBUS 251S, and standbys the reception of the response signal MBG regarding the MBR from the M bus arbiter of MBUS 251S. At this case, once the MBG signal is received, read controller 318 checks whether or not another master uses MBUS 251S, and when checked that another master used the MBUS 251S, asserts the MBB to be the master, thereby reading the data stored at read buffer 320 and outputting the read data to MBUS 251S.

FIGS. 6A–6G show operational characteristics of the device for transferring thereto. The data as illustrated in FIGS. 6A–6G, are waveforms indicative of characteristic of interfacing dualization controller 300 and MBUS 251 according to an embodiment of the present invention.

Dualization controller 300 having the construction as depicted in FIGS. 4 and 5, transfers the data from the dualization controller in the active mode to the dualization controller in the standby mode. Resultedly, it can be seen that the construction of dualization controller 300 for being automatically switched by sensing the abnormal state of the corresponding main processor in the dualization controller is omitted hereinafter.

Concerning FIGS. 4 to 6G, MBUS 251 in the active mode stores the MBUS signals, more concretely, MAD[63:0], MAS, MRDY, MRTY, MERR and MBB at write buffer 314.

Additionally, MBUS 251 transfers the MBUS signals stored at write buffer 314 to FBUS 257 by a next output signal as shown by FIG. 6A.

At this point, write controller 312 analyzes FMAD [39:26], FMAS, FMBB, and FMRDY among signals transferred to FBUS 257 and determines whether or not FMAD [63:0], FMAS, FMRDY, FMERR to be transmitted from dualization controller 300S in the standby mode are stored at FIFO 316. To satisfy this, firstly, when FMAS [39:26] is in a logic low state as shown by FIG. 6C, write controller 312 is considered to be in the address mode, analyzes the FMAD[39:26], and checks whether the FMAD is WR (write) of the memory region or a coherent write and invalid transaction (CWI transaction). Here, when the FMAD was the WR of the memory region or the CWI transaction, write controller 312 outputs FIFOCS as a selection signal of FIFO 316 and FIFOWRE as a write enable signal to FIFO 316. Thus, FIFO 316 stores the FMAD[63:0] and FMAS in the address mode output to write buffer 314. Hereinafter, when the FMAS is in a logic high state and the FMRDY is in the logic low state, write controller 312 is considered to be in the data mode, generates FIFOCS and FIFOWRE, and outputs the generated FIFOCS and FIFOWRE to FIFO 316. Due to this, FIFO 316 receives and stores the FMAD[63:0], FMRDY, FMRTY, FMERR in the data mode output through FBUS 257 from write buffer 314. The data mode following to the address mode in one transaction can be repeated from 1 time to 4 times according to the MBUS transaction, wherein MAD[63:] is shown by FIG. 6B.

When the above data is stored, FIFO 316 outputs the OR(output ready) signal to read controller 318, and read controller 318 senses that the data to be transferred through the OR signal to write buffer 320 existed in FIFO 316.

Upon reception of the OR signal, read controller 318 checks whether or not data which is not yet transferred to MBUS 251S in the standby mode is stored at read buffer 320.

At this event, in the empty status, read buffer 320 generates FIFORDE as the read enable signal and FIFOCS in order to read the data stored at FIFO 316, and outputs the generated signals to FIFO 316. In that case, FIFO 316 outputs the XMAD[63:0] and XMAS in the address mode under storing, and read controller 318 produces a write address WA[2:0] and the write enable signal BUFWR of read buffer 320 so as to store the information of the address mode output to FIFO 316 at read buffer 320, thereby outputting the produced signals to read buffer 320. Then, read buffer 320 stores the XMAD[63:0] of the address mode output from FIFO 316 and can be converted into the WR transaction to be stored in case of the CWI transaction.

Read controller 318 analyzes the XMAD[42:40] among XMAD[63:0] in the address mode read at FIFO 316 and the transaction size, continuously reads the XMAD[63:0] of the data mode as much as the above analyzed size, and stores the continuously stored signal at read buffer 320.

While storing the information read from FIFO 316, read controller 318 outputs an MBR (M bus request) as a request signal of MBUS 251 to MBUS 251S in the standby mode, to be a master of MBUS 251S in the standby mode. MSI (M bus to S bus interface) 222S as the MBR (M bus arbiter) for receiving the MBR, outputs the MBG (M bus Grant) as the confirmation response signal of the MBR to read controller 318 in response to the output of the MBR as described above.

Read controller 318 outputs the MBR signal, checks whether or not another master uses 8 MBUS 251S in the standby mode, and when checked that the another master did not use MBUS 251S in the standby mode, that is, when checked that the MBG is activated, produces and outputs the MBB (M bus busy) signal as an occupation signal of MBUS 251S to MBUS 251S, thereby becoming the master of MBUS 251S. At this time, when checked that the another master used MBUS 251S in the standby mode, read controller 318 becomes the master of MBUS 251S in the standby mode after standing by until the release of MBUS 251S in the standby mode.

When being the master of MBUS 251S, read controller 318 produces the read address signal RA[2:0] and the read address enable signal BUFRD of read buffer 320 and outputs the generated signals to read buffer 320. Thus, the MAD [63:0] of the address mode stored at read buffer 320 is read to be transferred to MBUS 251S in the standby mode, and the signal MAS representing that the MAD [63:0] transferred to MBUS 251S in the standby mode is the address mode, is output to MBUS 251S.

After that, read controller 318 repeatedly outputs the read address signal RA[2:0] and the read address enable signal BUFRD to read buffer 320. In this case, the MAD[63:0] of the data mode stored at read buffer 320 is read to be transferred to MBUS 251S in the standby mode, and then, read controller 318 normally completes the transaction upon respective reception of the MRDY indicative of input of the normal reception signal from MBUS 251S in the standby mode.

As apparent from the foregoing, the present invention according to an embodiment of the present invention dualizes the main processors of the ATM switch, and automatically transfers the data of the active main processor to the standby main processor in the dualization construction, thereby positively enhancing the reliability of the ATM switch.

Therefore, it should be understood that the present invention is not limited to the particular embodiment disclosed herein as the best mode contemplated for carrying out the present invention, but rather that the present invention is not limited to the specific embodiments described in this specification, except as defined in the appended claims.

What is claimed is:

1. A device for dualizing main processors in an asynchronous transfer mode switch, comprising:

dualization controllers, each of which is in an active mode and a standby mode and connected with memories of each of corresponding modes by way of a main bus (MBUS), each of said dualization controller is comprised of:

a first-in first-out;

a write buffer connected between said MBUS in said active mode and said first-in first-out;

a write controller for storing data stored at said write buffer at said first-in first-out;

a read buffer connected between said MBUS in said standby mode and said first-in first-out;

a read controller for simultaneously storing data stored at said first-in first-out, at said read buffer, checking status of said MBUS in said standby mode, and outputting the data stored at said read buffer to said MBUS in said standby mode.

2. A method for transferring data of main processors in an asynchronous transfer mode switch which has dualization controllers in an active mode and in a standby mode, each of said dualization controllers for connecting said main processors of each subsystem with memories of each of corresponding modes through a MBUS, is comprised of a write buffer, a first-in first-out, and a read buffer, comprising the steps of:

storing data of said MBUS in said active mode at said first-in first-out by controlling said write buffer;

upon generation of a data storing signal in said first-in first-out, reading data from said first-in first-out and storing said read data at said read buffer; and upon non-usage after checking the status of said MBUS in said standby mode, transferring data stored at said read buffer to said MBUS in said standby mode.

3. An asynchronous transfer mode switch, comprising:

a first main processor operating in an active mode and a second main processor operating in a standby mode, wherein each of said first and second main processors is comprised of a corresponding dualization controller wherein the dualization controller of said first main processor receives data from a main bus and transfers said data to the dualization controller of said second main processor for output over a standby main bus, said dualization controller of said first main processor comprising:

a write buffer connected between said main bus for storing the data received from said main bus;

a first-in first-out memory means; and a write controller for controlling the storage of said data from said write buffer into said first-in first out memory means; and said dualization controller of said second main processor comprising:

a read controller for reading said data stored in said first-in first-out memory means and for outputting said data from said first-in first-out memory over a transfer bus; and a read buffer controlled by said read controller for storing said data output over said transfer bus, said data stored in said read buffer being output to said stanby main bus.

4. The asynchronous transfer mode switch as set forth in claim 3, wherein said first-in first-out memory means generates an output ready signal in response to said data having been stored in said first-in first-out memory means and outputs said output ready signal to said read controller for informing said read controller that there is data ready to be transferred to said stanby main bus.

5. The asynchronous transfer mode switch as set forth in claim 3, wherein said read buffer comprises a dual port random access memory.

6. The asynchronous transfer mode switch as set forth in claim 4, wherein said read controller checks said read buffer for data already stored in said read buffer, and when said read controller determines that no data is already stored in said read buffer, controls the transfer of said data stored in said first-in first-out memory to said read buffer.

* * * * *